530-353 SR
C5227 XR 4,548,608

United States Patent [19]
Swanson et al.
[11] Patent Number: 4,548,608
[45] Date of Patent: Oct. 22, 1985

[54] DEPILATING COMPOSITION AND METHOD

[75] Inventors: Harley D. Swanson, Denver; Terry L. McAninch, Westminster, both of Colo.; J. Keith Conner, Bellevue, Wash.

[73] Assignee: Birko Corporation, Westminster, Colo.

[21] Appl. No.: 591,445

[22] Filed: Mar. 20, 1984

[51] Int. Cl.$^4$ ........ C14C 1/06; C07G 7/00

[52] U.S. Cl. ........ 8/94.16; 8/94.18; 260/123.7; 252/8.57

[58] Field of Search ........ 8/94.16; 252/8.57

[56] References Cited

U.S. PATENT DOCUMENTS 3,097,912 7/1963 Booth ........ 8/94.16
3,271,258 9/1966 Zviak et al. ........ 8/94.16
3,912,448 10/1975 Howe ........ 8/94.16

Primary Examiner—Maria Parrish Tungol
Attorney, Agent, or Firm—Jerry W. Berkstresser; Bruce G. Klaas

[57] ABSTRACT

A composition for removing hair from full hair whole carcasses, skins, hides and pelts comprising:

| | Approx. Wt. (%) |
|---|---|
| Water | 78.00-94.00 |
| Sodium Hydroxide | 2.00-6.00 |
| Sodium Gluconate | 0.10-0.50 |
| Trisodium Phosphate | 1.00-3.00 |
| Triethanolamine Lauryl Sulfate | 0.50-2.00 |
| Cocodiethanolamide | 0.05-0.10 |
| Sodium Metasilicate | 0.50-0.20 |
| Sodium Thioglycolate | 0.45-5.00 |
| Triethonolamine Dodecyl Benzene Sulfonate | 0.50-1.50 |
| Calcium Hydroxide | 1.00-4.00 |

6 Claims, No Drawings

TX 530/353
X 530/356
X 530/842

DEPILATING COMPOSITION AND METHOD

BACKGROUND OF THE INVENTION

This invention relates to removing hair from hides, skins, pelts and whole carcasses. In general, the compositions and methods of the present invention are useful in dehairing animal carcasses where the hide is either removed or remains on the carcass and in particular is useful in dehairing hog carcasses, including carcasses containing so-called hard hair. This invention also relates to denuding poultry.

Currently, hair removal from whole carcasses has conventionally been accomplished by the use of large scald tanks, typically having upwards of 20,000 gallons capacity. The carcass is immersed into the tank for a short period of time, typically about 3-7 minutes in a water based solution of various chemicals at about 136° F. to 140° F., primarily to loosen the hair on the hide of the carcass. The carcass is then moved into a dehairing machine or defeathering machine where the hide is mechanically abraded to remove the loosened hair scurf or feathers. In some cases, where these procedures do not completely remove the unwanted hair, particularly in the case of so-called hard hair, the remaining hair is manually singed away and shaved before the carcass is further prepared for subsequent processing.

Hard hair sometimes requires special treatment. The so-called hard hair season is generally encountered in carcasses obtained from July to about December, depending on the section of the country. The hair on the carcass at that time is resistant to removal by the previously described conventional scald tank procedure. At the present time, there are no commercially available government approved formulations that can be employed in the scald tank to effectively remove hard hair. Under these circumstances the carcass will be singed and shaved.

It is therefore an objective of the present invention to provide a chemical composition which will effectively loosen and remove hair or feathers from whole carcasses, skins, pelts and hides regardless of the characteristics encountered, which is employed either as a foam, spray or bath.

It is a further objective of the present invention to provide a chemical composition which is capable of being applied as a foam to the carcass, skin, hide or pelt to loosen and remove hair which composition can be rinsed off thereby obviating the need for expensive scald tanks.

It is a further objective of the present invention to provide a chemical composition from which it is possible to recover feed grade protein during rendering from hair or feathers which have been removed according to this invention or otherwise.

BRIEF DESCRIPTION OF THE INVENTION

It has been discovered that a composition comprising preselected proportions of an alkali, buffering agents, surface active agents, thioglycolates and optionally, foaming agents and stabilizers can be effectively employed, either in a chemical bath or as a foam to facilitate hair removal from carcasses, skins, hides and pelts. In particular, the compositions and methods of the present invention employ specific proportions of sodium hydroxide, sodium gluconate, sodium thioglycolate, tri-sodium phosphate, alkylaryl sulfonate such as triethanolamine dodecylbenzene sulfonate, and fatty acid alkanolamide to achieve the hair removal hereinafter described.

In addition, the above composition without the thioglycolate, can be employed to recover feed grade protein from removed hair and feathers.

DETAILED DESCRIPTION OF THE INVENTION

Alkaline systems have had a long history in the depilation process where it has been hypothesized the chemicals react with disulfide bonds in hair or other protein thereby weakening and loosening the hair shaft from its point of dermal attachment. Increased concentration of alkaline materials has been previously reported to shorten the hair-loosening time which can be effected similarly in combination with other chemical compounds. This concept has been most frequently applied to hair removal on hides, skins, and pelts prior to tanning. The present invention, in addition to the forgoing, is concerned with removal of hair or other proteins from the dermal layer of freshly killed hogs, especially during the hard hair season when the hair on the animal is more resistant to removal by existing methods. In addition, the present invention is applicable to the dehairing of hides, skins and pelts which are to be subsequently rendered.

What is suggested is that the chemical formulations of the present invention preferably be applied as a foam to penetrate the hair and hair roots on the exterior of freshly killed animals or poultry. It has been found empirically that a foam layer of the chemical compositions described herein at approximately 140° F. loosens hair with sufficient efficiency so that minimum time, labor, and energy are required to prepare the animal for inspection, thereby eliminating various conventionally employed equipment.

Typically, the present invention preferably employs predetermined concentrations of the following constituents:

- Water
- Sodium Hydroxide
- Sodium Gluconate
- Trisodium Phosphate
- Triethanolamine Lauryl Sulfate and/or Sodium Lauryl Sulfate
- Cocodiethanolamide
- Sodium Metasilicate
- Sodium Potassium and/or Ammonium Thioglycolate
- Triethanolamine Dodecyl Benezene Sulfonate and/or Sodium Dodecylbenzene Sulfonate
- Calcium Hydroxide The mixture is dissolved in a predetermined quantity of potable water and sprayed as a foam at about 140° F. onto the freshly killed animal. Within a time of 30 to 120 seconds there is a loosening of the hair to a point of easy removal without apparent harm, disfigurement or toxicity to the dermal layer, including the bulb of the hair follicle. Residual chemical is removed from the carcass exterior by thorough potable water rinse.

Alkaline systems, generally in some combination with calcium hydroxide, have reportedly been used as a depilatory agents on beef hides and skins, pigskins, sheep skins and pelts, plus tanned derivatives from other domestic and feral animals. It has been further reported that increasing alkalinity and temperature enhance the hair-loosening process. Aliphatic amines in the form of monoethylamine and ethylenediamine, but not trimethylamine, in combination with calcium hydroxide have also been reported to accelerate the hair-loosening process and it is found here that triethanolaminedodecylbenzene sulfonate, as an amine, similarly accelerates the rate of reaction when used with sodium hydroxide whereby, it is believed, a faster and greater penetration of the hydroxide is promoted by the action of the amine employed herein. The overall effects noted in this invention appear to be synergistic where the combination of sodium hydroxide, triethanolaminedodecylbenzene sulfonate, sodium phosphate (tribasic), and sodium gluconate provide an unexpected improvement in the results.

Both sodium phosphate (tribasic) and sodium gluconate have been found to play a minor but important role in the hair-loosening process. For example, sodium phosphate in the tribasic form is known in part for its buffering ability and very likely assists in stabilizing the high pH (pH—13) thus extending an alkaline contact time with disulfide bonds in the hair protein. A further possible function of sodium phosphate is as an emulsifier where in the practice of the present invention the phosphate alone or in combination with other ingredients in the composition solubilizes or emulsifies sebaceous material indigenous to the hair shaft and surrounding area allowing faster and more complete penetration of the aliphatic amine and hydroxide to the innermost portion of the hair shaft. Sodium gluconate is a known chelating or sequestering agent, generally of positively charged ions. Its effect in combination with other ingredients in the composition has been observed but the reason for its participation in the hair-loosening phenomenon remains unknown. One possibility is that the sodium gluconate in the system equesters or chelates certain cations which would otherwise interfere with the hair-loosening process or with other products that are formed in the process which, if not sequestered would interfere with the depilation.

Thioglycolates, thioglycolates, alkali, alkaline earth and ammonium, which could be used in higher concentrations than employed herein to enhance hair removal, however, the previous use of thioglycolates has been in relatively high weight percent proportions which required careful temperature control as any sudden drop in temperature would tend to precipitate the thioglycolate which renders the composition unsuitable for use in depilation.

Alkylaryl sulfonate and fatty acid alkanolamide as part of the invention offer foaming capabilities so that when the chemical mixture is applied to the exterior hog carcass active ingredients in the form of sodium hydroxide, triethanolamine dodecylbenzene sulfonate and/or sodium dodecylbenzene sulfonate, sodium phosphate (tribasic), and sodium gluconate are in contact with active sites, i.e., disulfide amino acid bonds in cystine hair protein, for a longer time than otherwise possible without a blanket of foam.

One of the major problems encountered in highly alkaline dipilatory compositions has been the swelling of the hair root in the follicle without weakening of the bond between the bulb and the surrounding chemical layer which then interferes with effective removal of the hair shaft using conventional procedures.

In particular, the compositions of the present invention for foam depilitation and protein recovery are preferably formulated respectively as follows. A composition suitable and effective for foaming with conventional air foaming nozzles would preferably comprise the following components and proportions:

| Composition No. 1 | |
|---|---|
| Component | Range Wt. (%) |
| Water | 78.00-94.00 |
| Sodium Hydroxide | 2.00-6.00 |
| Sodium Gluconate | 0.10-0.50 |
| Trisodium Phosphate | 1.00-3.00 |
| Triethanolamine Lauryl Sulfate | 0.50-2.00 |
| Cocodiethanolamide | 0.05-0.10 |
| Sodium Metasilicate | 0.50-0.20 |
| Sodium Thioglycolate | 0.45-5.00 |
| Triethanolamine Dodecyl Benezene Sulfonate | 0.50-1.50 |
| Calcium Hydroxide | 1.00-4.00 |

A modified composition suitable and effective for protein recovery prior to rendering would preferably comprise the following components and proportions.

| Composition No. 2 | |
|---|---|
| Component | Range Wt. (%) |
| Water | 87.00-94.00 |
| Sodium Hydroxide | 4.00-8.00 |
| Trisodium Phosphate | 2.00-3.00 |
| Sodium Gluconate | 0.25-1.00 |
| Triethanolamine Dodecyl Benzene Sulfonate | 0.10-0.50 |
| Sodium Metasilicate | 0.10-0.50 |

Most preferably the compositions would be approximately as follows:

| Composition No. 1 | |
|---|---|
| Component | Wt. (%) |
| Water | 88.8 |
| Sodium Hydroxide | 4.3 |
| Sodium Gluconate | 0.35 |
| Trisodium Phosphate | 1.70 |
| Triethanolamine Lauryl Sulfate | 0.70 |
| Cocodiethanolamide | 0.05 |
| Sodium Metasilicate | 0.75 |
| Sodium Thioglycolate | 0.6 |
| Triethanolamine Dodecyl Benezene Sulfonate | 0.75 |
| Calcium Hydroxide | 2.00 |

| Composition No. 2 | |
|---|---|
| Component | Wt. (%) |
| Water | 89.15 |
| Sodium Hydroxide | 7.25 |
| Trisodium Phosphate | 2.50 |
| Sodium Gluconate | 0.50 |
| Triethanolamine Dodecyl Benzene Sulfonate | 0.30 |
| Sodium Metasilicate | 0.30 |

The previously identified composition No. 1 can be applied as a foam, spray or bath to a fully haired whole hog carcass at a foam, spray or bath temperature between 125° F. and 140° F. When a foam is employed, this is accomplished by heating the foaming air to about 190° F. with a solution temperature of about 140° F. The foam thus formed is allowed to remain on the carcass for approximately 3-6 minutes before rinsing the carcass with water. The hair removal after rinse was within the limits permitted by existing government regulations. The same composition applied at a foam temperature of 95° F. was ineffective to remove sufficient hair after six (6) minutes.

As previously indicated, thioglycolic acids, namely sodium, calcium and ammonium salts, have been used to cleave covalently linked amino acid bonds, including disulfide bonds, in the hair protein. Many depilatories in the cosmetics industry and those used in the industrial processing of pelts, skins and the hides have a thioglycolic acid concentration at about the 2.5% to 3.0% level and at times double this concentration. The current invention owing to its high level of alkalinity and hydrogen ion concentration stabilized with a pH value between 12.0 to 13.5 and the presence of surface active agents in the mixture permits the use of a substantially lower concentration of the thioglycolic acid but retains an extremely fast time of reaction whereas in a cosmetic formulation there would be a reaction time generally at up to about 12 minutes or more and in the industrial depilation of pelts, skins and hides a reaction time of up to 12 to 14 hours or longer. However, when the current Composition No. 1 is applied as a foam at between 125° F. to 140° F. to a freshly killed carcass having residual hair, the reaction time to sufficiently loosen the hair is within 6 minutes. The treated carcass is then passed through a polisher, which is a conventional apparatus containing some form of a mechanical abrading device with a water rinse at about 140° F., for complete removal of all hair, including scurf, bristle and new hair.

It is known that a rapid drop in temperature of a solution containing salts of thioglycolic acid will result in crystallization and precipitation of the salts making them ineffective to react with amino acid covalent bonds. There was found in the experimental procedure that when the chemical temperature at the dispensing hose was 140° F. and the foam on the full-hair skin, some 12 to 18 inches away, registered a temperature as low as 95° F., the observed depilatory effect was negative. However, when the foam after careful application onto full-hair skins registered between 125° F. to 140° F., then depilation occurred within 1 to 6 minutes.

An advantage of the invention and process includes a distinct financial savings to the red meat industry where in a pork processing plant the need for a scald tank which under existing working conditions contains approximately 20,000 to 40,000 gallons of potable water maintained at 140° F. could be eliminated. Also, it is possible to eliminate the dehairing machine and singer, which is a high intensity gas flame device whose purpose is to burn off residual scurf and bristle. The same composition as previously described in a liquid form in a scald tank can accomplish similar results.

With respect to the benefit of protein recovery, rendered animal products have a commercial value in light of their use in part as an animal feed (also referred to as meat meal and bone meal) where the nutritional level of this feed is determined by the percent of feed grade protein available in the feedstock. Thus, the higher the percent protein on a weight basis, the greater is the value of the product. It is also known that many digestible proteins are of an alpha helix molecular arrangement. However, hair owing to its beta helix configuration, is normally non-digestible. It has therefore been necessary, in the past, to separate animal hair from digestible protein in the rendering process in order to obtain a commercially saleable product. The separation is generally performed by costly mechanical means. The present invention is designed, in part, to separate hair from the pelt, skin or hide and by chemical action convert the same into feed grade protein by producing digestible amino acid units. It has been observed through experimental testing that an increase of at least 3% by weight of total protein in animal feeds is obtained when the raw materials had been treated previously with Composition No. 2 of this invention. Thus, the nature of this new formulation and process appears to be a conversion by hydrolysis of the beta helix structured hair shaft to a more basic or simpler amino acid units. Furthermore, the tallow and grease as final rendered products do not appear to be adversely affected by the above chemical treatment but in fact show a distinct improvement where the color of the treated samples was found to have an FAC value of 9 but control samples which remained untreated but taken from the same lot were found to have an FAC color value of 11, where the higher values are less desirable. The free fatty acid value (ffa) of the treated samples was found to be 2.4 percent whereas the control or untreated sample has an ffa value of 2.1 percent. The 0.3 percent increase could be accounted for by the overall increase in amino acid concentration.

Full hair pelts, skins, and hides are combined with the above solution previously heated to a temperature of between 120° F. and 212° F. and allowed to soak for between about 10 minutes to about 30 to 60 seconds respectively after which time the treated materials and chemical liquor are then transported to rendering. Approximately 10 pounds of the chemical solution of the present invention have been found to treat about 60 pounds of raw material.

It is contemplated that the inventive concepts herein described may be variously otherwise embodied and it is intended that the appended claims be construed to include alternative embodiments of the invention except insofar as limited by the prior art.

What is claimed is:

1. A method of removing hair from whole carcasses, skins, hides and pelts comprising (1) applying to the carcass, skin, hide and pelt an effective amount of a composition comprising:

| | Approx. Wt. (%) |
|---|---|
| Water | 78.00-94.00 |
| Alkali Hydroxide | 2.00-6.00 |
| Alkali Gluconate | 0.10-0.50 |
| Trisodium Phosphate | 1.00-3.00 |
| Triethanolamine Lauryl Sulfate or Sodium Lauryl Sulfate or both | 0.50-2.00 |
| Cocodiethanolamide | 0.05-0.10 |
| Sodium Metasilicate | 0.50-0.20 |
| Alkali, alkaline Earth or Ammonium Thioglycolate or a combination thereof | 0.45-5.00 |
| Triethanolamine Dodecyl Benzene Sulfonate | 0.50-1.50 |
| Alkaline Earth Hydroxide | 1.00-4.00 |

(2) leaving the composition in contact with the hair to be removed for predetermined period of time at a predetermined temperature; and (3) rinsing the composition and unwanted hair from the carcass, skin, hide or pelt with water.

2. The method of claim 1 wherein the temperature of the composition in contact with the hair is between about 125° F. and 140° F.

3. The method of claim 1 wherein the composition comprises:

| | Approx. Wt. (%) |
|---|---|
| Water | 88.8 |
| Sodium Hydroxide | 4.3 |
| Sodium Gluconate | 3.5 |
| Trisodium Phosphate | 1.70 |
| Triethonolamine Lauryl Sulfate | 0.70 |
| Cocodiethonolamide | 0.5 |
| Sodium Metasilicate | 0.75 |
| Sodium Thioglycolate | 0.6 |
| Triethonolamine Dodecyl Benzene Sulfonate | 0.75 |
| Calcium Hydroxide | 2.00 |

4. The method of claim 3 wherein the temperature of the composition in contact with the hair is between 125° F. and 140° F.

5. A composition for removing hair from full hair whole carcasses, skins, hides and pelts comprising:

| | Approx. Wt. (%) |
|---|---|
| Water | 78.00–94.00 |
| Sodium Hydroxide | 2.00–6.00 |
| Sodium Gluconate | 0.10–0.50 |

-continued

| | Approx. Wt. (%) |
|---|---|
| Trisodium Phosphate | 1.00–3.00 |
| Triethanolamine Lauryl Sulfate | 0.50–2.00 |
| Cocodiethanolamide | 0.05–0.10 |
| Sodium Metasilicate | 0.50–0.20 |
| Sodium Thioglycolate | 0.45–5.00 |
| Triethonolamine Dodecyl Benzene Sulfonate | 0.50–1.50 |
| Calcium Hydroxide | 1.00–4.00 |

6. A composition for removing hair from full hair whole carcasses, skins, hides and pelts comprising:

| | Approx. Wt. (%) |
|---|---|
| Water | 88.8 |
| Sodium Hydroxide | 4.3 |
| Sodium Gluconate | 3.5 |
| Trisodium Phosphate | 1.70 |
| Triethanolamine Lauryl Sulfate | 0.70 |
| Cocodiethanolamide | 0.5 |
| Sodium Metasilicate | 0.75 |
| Sodium Thioglycolate | 0.6 |
| Triethanolamine Dodecyl Benzene Sulfonate | 0.75 |
| Calcium Hydroxide | 2.00 |

* * * * *